(12) United States Patent
Hart

(10) Patent No.: US 6,397,590 B1
(45) Date of Patent: Jun. 4, 2002

(54) HYDRAULIC WARMING SYSTEM FOR USE IN LOW AMBIENT TEMPERATURE APPLICATIONS

(75) Inventor: Kenneth E. Hart, Simi Valley, CA (US)

(73) Assignee: HR Textron Inc., Valencia, CA (US)

( * ) Notice: Subject to any disclaimer, the term of this patent is extended or adjusted under 35 U.S.C. 154(b) by 0 days.

(21) Appl. No.: 09/571,091

(22) Filed: May 15, 2000

(51) Int. Cl.⁷ ............................................... F16D 39/00
(52) U.S. Cl. ........................... 60/329; 91/419; 91/431; 244/78
(58) Field of Search ................ 60/329, 456; 91/431, 91/419; 92/82, 144; 244/77, 78, 220, 221

(56) References Cited

U.S. PATENT DOCUMENTS

| | | | |
|---|---|---|---|
| 2,721,447 A | | 10/1955 | Hancock |
| 3,813,990 A | * | 6/1974 | Coppola et al. .......... 244/77 R |
| 4,129,986 A | | 12/1978 | Heinrich |
| 4,680,928 A | | 7/1987 | Nishikawa et al. |
| 4,951,466 A | | 8/1990 | Macht |
| 4,972,762 A | | 11/1990 | Kubik |
| 5,109,672 A | * | 5/1992 | Chenoweth et al. .......... 244/78 |
| 5,115,694 A | | 5/1992 | Sasaki et al. |
| 5,181,380 A | * | 1/1993 | Favre et al. .................. 60/405 |
| 5,410,878 A | | 5/1995 | Lee et al. |
| 5,456,078 A | | 10/1995 | Goloff |
| 5,562,190 A | | 10/1996 | McArthur |
| 5,600,954 A | | 2/1997 | Bay et al. |
| 5,667,051 A | | 9/1997 | Goldberg et al. |

FOREIGN PATENT DOCUMENTS

DE          2150710          5/1973

* cited by examiner

Primary Examiner—Edward K. Look
Assistant Examiner—Thomas E. Lazo
(74) Attorney, Agent, or Firm—Fulbright & Jaworski L.L.P.

(57) ABSTRACT

A hydraulic warming system for low ambient temperature (0° to −65° F.) operation includes a hydraulic motor integrated in a valve manifold and driven by a two-stage jet pipe flow control electro-hydraulic servovalve mounted on the valve manifold in proximity thereof via a multi-port lapped spool-sleeve bypass-shutoff valve having a pre-loaded return spring. The spool is driven by a solenoid valve mounted on the valve manifold and coupled to the bypass-shutoff valve thereto between a first position and a second position. The first position utilizes the warmed low flow rate hydraulic leakage fluid from the servovalve to provide continuous warming of the internal rotating components of the hydraulic motor when the hydraulic motor is not operational. The second position includes diverting the warmed low flow rate hydraulic leakage fluid from the servovalve directly to hydraulic system return bypassing the internal rotating components of the hydraulic motor when the hydraulic motor is operational. In both positions, the servovalve is constantly pressurized from a hydraulic system supply source. The hydraulic motor is provided with a warming fluid inlet port in the ball bearing region of the motor which continuously receives warmed low flow rate leakage fluid from the servovalve when the bypass-shutoff valve is in first position. The warming fluid is returned to hydraulic system return via the case drain return port of the motor.

6 Claims, 2 Drawing Sheets

HYDRAULIC WARMING SYSTEM FOR USE IN LOW AMBIENT TEMPERATURE APPLICATIONS

BACKGROUND OF THE INVENTION

1. Field of the Invention

The present invention relates generally to hydraulic systems and more particularly to a hydraulic warming system for use in low ambient temperature applications.

2. Prior Art

Operation of aircraft hydraulic systems requires stable system performance under a wide range of low ambient operating temperatures, typically 0° to –65° F. In aircraft systems requiring the use of hydraulic motors of the piston type (in-line or bent-axis), such as leading-edge slat actuation systems, trailing-edge flap actuation systems, horizontal stabilizer trim actuation systems and tilt rotor pylon conversion actuation systems, one of the critical issues facing the hydraulic system manufacturer is maintaining hydraulic motor performance at vehicle-specified levels under low ambient temperature motor operation. As the ambient temperature decreases, which is a normal operating environment for a hydraulic motor in an aircraft flying at high altitude (typically above 10,000 feet) or in low temperature operating zones such as Alaska or for a prolonged period of time, the viscosity of the hydraulic fluid flowing through the motor increases dramatically which, if not heeded, may severely downgrade the hydraulic motor performance and ultimately affect the entire aircraft with serious consequences.

Various solutions to this problem have been proposed in the prior art over the years with limited success. For example, U.S. Pat. No. 4,129,986 to Heinrich discloses a method and means for preventing thermal shock to a hydraulic motor in low-temperature environments, in which warm oil is circulated through the motor before use. The method also includes the step of returning the warm oil to the tank after it has passed through the motor and if appropriate, it may also include the preliminary step of lowering the warm oil pressure before it is passed through the hydraulic motor. This particular approach requires modification of the motor itself and adding several components to the basic hydraulic circuit which raises the overall system cost and thus may not be a suitable solution for most hydraulic system manufacturers.

Another example is U.S. Pat. No. 4,972,762 to Kubik which teaches the use of a warm-up circuit for hydraulic pilot control systems in which fluid heated by an idling pump is used to warm-up the hydraulic fluid in the pilot control system. The warm-up circuit includes a pair of branch conduits commonly connected to the high pressure side of the pilot pressure pump and respectively connected via flow restriction means to the pilots of a primary directional control valve. Fluid can flow from the branch conduits through the pilots and then through the centered pilot valve to the low pressure side of the pilot pump allowing a warm-up circulation of fluid through the entire pilot circuit while the control valve remains centered. This approach calls for a complicated and inefficient hydraulic motor warming setup which also adds to the overall hydraulic system cost.

Various other patents disclose variations on the same cost-prohibitive hydraulic motor warming approach. Therefore, the need arises for a novel cost-efficient method and system for continuously warming the internal rotating components of a hydraulic motor when the same is not operational. A hydraulic system of this type may employ a piston-type hydraulic motor driven by a two-stage jet pipe flow control electro-hydraulic servovalve having a built-in internal fluid flow restrictor which automatically heats the hydraulic fluid flowing through it. The novel cost-efficient method may involve taking the heated hydraulic fluid flow already provided continuously through the first stage internal leakage fluid flow path of the two-stage jet pipe flow control electro-hydraulic servovalve and continuously passing the heated hydraulic servovalve leakage fluid through the hydraulic motor to raise and maintain the temperature of the internal rotating components of the hydraulic motor well above the low ambient temperature of the environment. Use of this novel approach will greatly increase the marketability of the hydraulic system as a whole and provide a viable low cost solution for the hydraulic system manufacturer and user as well.

SUMMARY OF THE INVENTION

The present invention is directed to a hydraulic warming system for low ambient temperature operation comprising hydraulic servo valve means for providing a flow of pressurized hydraulic fluid from a source thereof to a plurality of hydraulic load driving passageways; means for controlling the flow of pressurized hydraulic fluid in the plurality of hydraulic load driving passageways; a hydraulic motor coupled between the flow controlling means and a hydraulic system return passageway and driven by the pressurized hydraulic fluid from the hydraulic servo valve means through the plurality of hydraulic load driving passageways, the hydraulic motor having internal rotating components; and means for continuously warming the internal rotating components of the hydraulic motor when the hydraulic motor is not operational to improve the performance and efficiency of the hydraulic motor in a low ambient temperature environment. The hydraulic servo valve means includes a two-stage jet pipe flow control electro-hydraulic servovalve. The servovalve includes an inlet port coupled to the source for receiving pressurized hydraulic fluid from the source, a plurality of outlet ports coupled respectively to the plurality of hydraulic load driving passageways, a fluid flow restrictor and a return port for releasing internal hydraulic leakage fluid at low flow rate from the electro-hydraulic servovalve through a return passageway, the low flow rate internal hydraulic leakage fluid being warmed by flowing through the fluid flow restrictor.

In accordance with one aspect of the present invention, the flow controlling means includes a spool and sleeve bypass-shutoff valve having a pre-loaded return spring, a plurality of inlet ports coupled respectively to the plurality of hydraulic load driving passageways and to the return passageway and a plurality of outlet ports. The spool of the bypass-shutoff valve is driven linearly by a solenoid valve coupled to the bypass-shutoff valve between a first position and a second position, the first position utilizing the warmed low flow rate hydraulic leakage fluid from the servovalve to provide continuous warming of the internal rotating components of the hydraulic motor when the hydraulic motor is not operational, the second position diverting the warmed low flow rate hydraulic leakage fluid from the servovalve directly to the hydraulic system return passageway bypassing the internal rotating components of the hydraulic motor when the hydraulic motor is operational, the servovalve being constantly pressurized through the inlet port from the source.

In accordance with another aspect of the present invention, the hydraulic motor further comprises a case drain cavity having a return port coupled to the hydraulic system return passageway for closing the hydraulic system circuit and a plurality of inlet ports coupled respectively to at least some of the plurality of outlet ports of the bypass-shutoff valve through a plurality of hydraulic motor passageways, the hydraulic motor driven by pressurized hydraulic fluid flowing through the plurality of hydraulic motor passageways, the driven hydraulic motor returning pressurized hydraulic fluid at high flow rate to the hydraulic system return passageway, the warmed low flow rate hydraulic leakage fluid from the servovalve being combined with the high flow rate return flow from the hydraulic motor when the spool of the bypass-shutoff valve is in the second position.

In accordance with yet another aspect of the present invention, the warming means includes the servovalve fluid flow restrictor, a warming fluid inlet port on the hydraulic motor and a hydraulic motor warming passageway coupled between one of the outlet ports of the bypass-shutoff valve and the warming fluid inlet port for continuously flowing the warmed low flow rate hydraulic leakage fluid from the servovalve to the internal rotating components of the hydraulic motor when the hydraulic motor is not operational and the spool of the bypass-shutoff valve is in the first position, the hydraulic motor returning the warmed low flow rate hydraulic leakage fluid to the hydraulic system return passageway through the case drain cavity return port.

In accordance with still another aspect of the present invention, the hydraulic warming system further comprises a hydraulic fluid distributor for integrating the hydraulic load driving passageways, the servovalve return passageway, the hydraulic motor passageways and the hydraulic motor warming passageway. The hydraulic fluid distributor is a valve manifold having an inlet port for coupling to the source, a servovalve supply passageway coupled between the servovalve inlet port and the valve manifold inlet port and an outlet port for coupling to the hydraulic system return passageway, the servovalve operatively coupled to the valve manifold. The valve manifold further includes a recess for integrating the hydraulic motor proximate to the operatively coupled servovalve, the case drain cavity of the hydraulic motor defined in the recess.

These and other aspects of the present invention will become apparent from a review of the accompanying drawings and the following detailed description of the preferred embodiments of the present invention.

DESCRIPTION OF THE PREFERRED EMBODIMENTS

Hereinafter, some preferred embodiments of the present invention will be described in detail with reference to the related drawings of FIGS. 1–2. Additional embodiments, features and/or advantages of the invention will become apparent from the ensuing description or may be learned by the practice of the invention.

The following description includes the best mode presently contemplated for carrying out the invention. This description is not to be taken in a limiting sense, but is made merely for the purpose of describing the general principles of the invention.

The present invention refers to a hydraulic system for low ambient temperature (0° to −65° F.) operation in aircraft applications or the like. The hydraulic system includes a hydraulic motor integrated in a valve manifold. The hydraulic motor is driven by hydraulic fluid under pressure which is controlled by a two-stage jet pipe flow control electro-hydraulic servovalve mounted at one end of the valve manifold. A two-position multi-port lapped spool-sleeve bypass-shutoff valve is disposed between the servovalve and the motor to open and close flow paths for hydraulic fluid. The bypass-shutoff valve includes a pre-loaded return spring with the spool being driven by a three-way, two-position solenoid valve mounted on the valve manifold and coupled to the bypass-shutoff valve. The hydraulic system includes means for warming the internal rotating components of the hydraulic motor when the motor is not operational. The warming means includes the restricted orifice of the jet pipe used in the servovalve.

Figure 1:
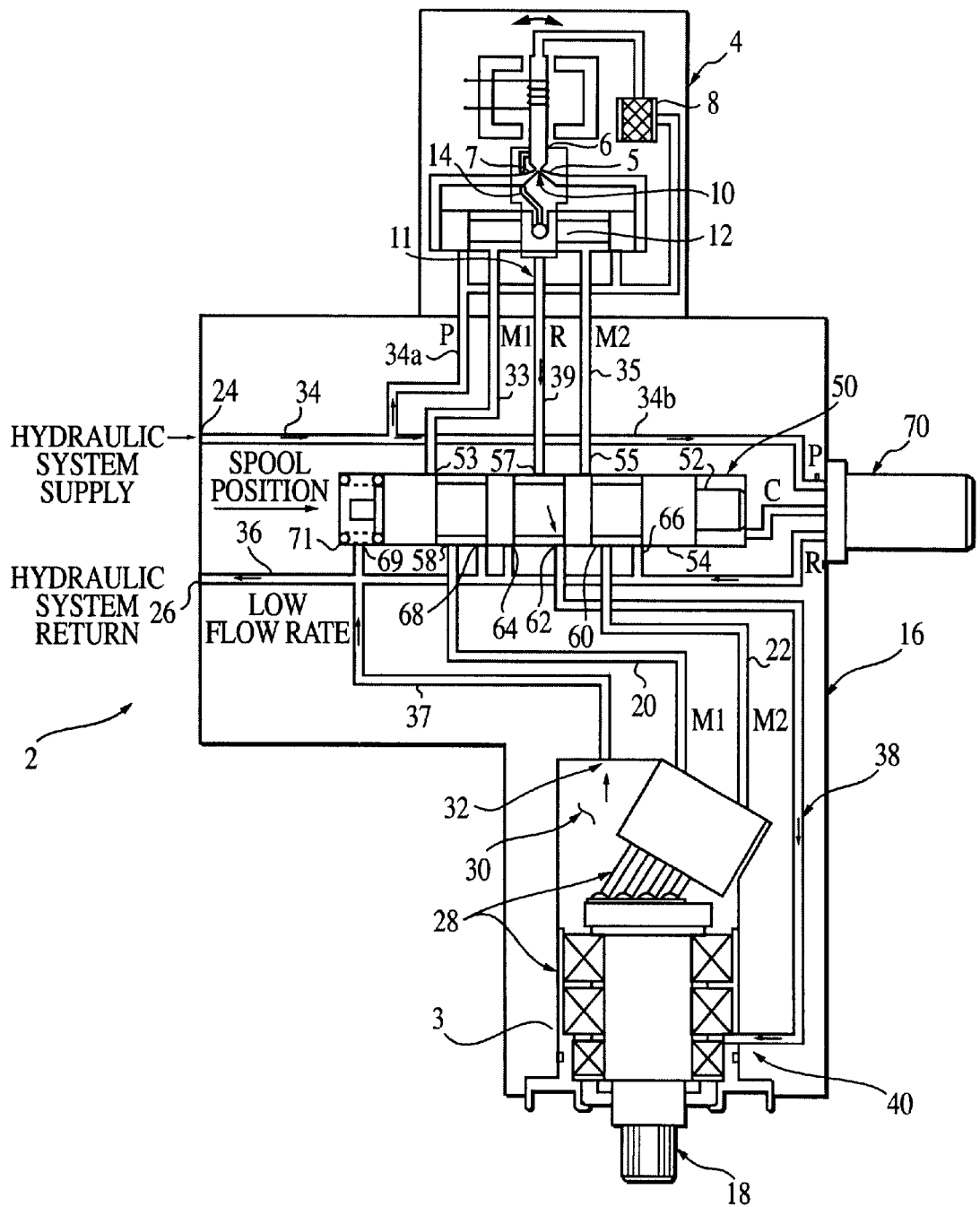
FIG. 1 is a schematic representation of one embodiment of a hydraulic system for use in accordance with the present invention.
Figure 2:
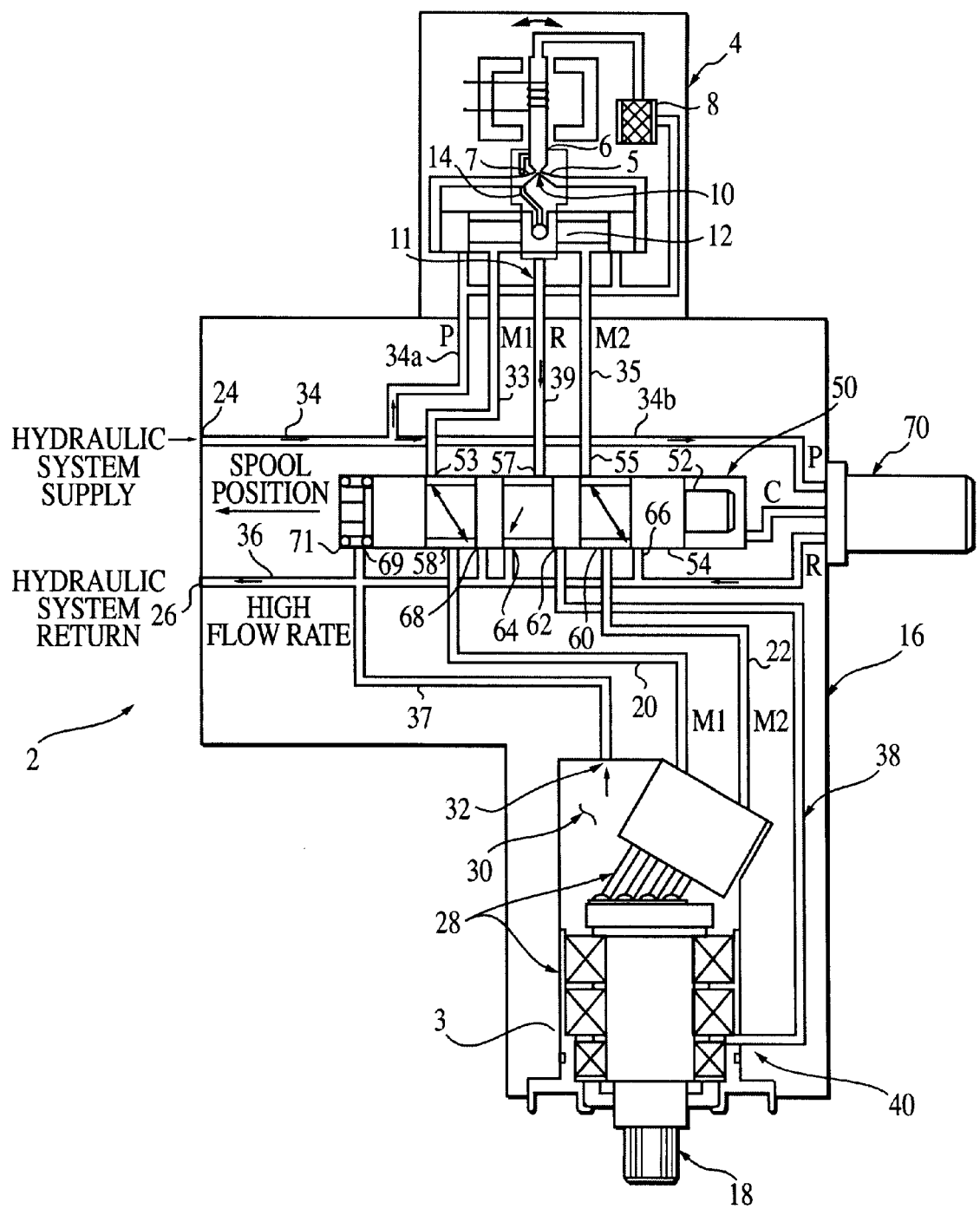
FIG. 2 is a schematic representation of another embodiment of a hydraulic system for use in accordance with the present invention.

Referring now more particularly to FIGS. 1–2, a hydraulic system, generally referred to by reference numeral 2, is shown for use in accordance with the general principles of the present invention. Hydraulic system 2 includes a standard two-stage jet pipe flow control electro-hydraulic servovalve 4 having a jet pipe 6, a first stage hydraulic filter 8, a spool 12 and a feedback wire assembly 14. Servovalve 4 is also provided with an inlet port P for receiving pressurized hydraulic fluid from a hydraulic system supply source (FIG. 1), a pair of outlet ports $M_1'$ and $M_2'$, a return port R for returning internal hydraulic leakage fluid at low flow rate back to the system return and an internal fluid flow restrictor in the form of a fixed orifice 10 at the jet pipe outlet. Jet pipe 6 provides a flow of fluid under pressure through receiver ports 5 and 7 as a control signal for the two end chambers of spool 12. As spool 12 reciprocates, high pressure hydraulic fluid flows from hydraulic system supply through spool 12 and outlet ports $M_1'$ or $M_2'$ to hydraulic motor 18 and from motor 18 through ports $M_1'$ or $M_2'$ to return as well known to those skilled in the art. Hydraulic fluid flowing out of fixed orifice 10 is at lower pressure, has relatively high flow rate and is heated as a result of its passage through orifice 10. As an example, if the system supplied hydraulic fluid is at 3000 psig and the fixed orifice diameter is approximately 0.008"–0.010", the temperature differential (ΔT) between the temperature of the incoming hydraulic fluid and the temperature of the outgoing hydraulic fluid from orifice 10 will be about 16° F. with the heated internal hydraulic leakage fluid exiting return port R at 50 psig pressure and flowing at a rate of approximately 0.1–0.2 gpm.

Servovalve 4 is preferably mounted via four bolts (not shown) on one end of a standard aluminum alloy valve manifold 16 which has an integrated hydraulic motor 18 at the opposite end. Valve manifold 16 is provided with a system inlet port 24 coupled on one side to the hydraulic system supply source and on the other side to an integrated input passageway 34 which has two branches 34a and 34b. Branch 34a is coupled to inlet port P of servovalve 4 and branch 34b is coupled to inlet port $P_1$ of a solenoid valve 70. Valve manifold 16 is also provided with a system return port 26 coupled on one side to a hydraulic system return and on the other side to an integrated output passageway 36.

Hydraulic motor 18 is preferably integrated in a recess 3 of valve manifold 16 as shown in FIGS. 1–2 and is of the bent-axis piston type having internal rotating components 28 with the shaft capable of 360° rotation in both directions, clockwise and counterclockwise. Recess 3 defines a case drain cavity 30 which has a return port 32 coupled to an integrated case drain return passageway 37 which connects with integrated valve manifold output passageway 36 for returning leakage fluid from the motor pistons and cylinder block of motor 18 to the hydraulic system return closing the hydraulic system circuit. Hydraulic motor 18 is integrated to lower the cost of manufacturing the hydraulic warming system and to transfer structural loads to valve manifold 16 during application. The present invention is not limited to using an integrated hydraulic motor, stand-alone hydraulic motors may be used as well with appropriate connections to the valve manifold. Other methods of coupling servovalve 4 to stand-alone hydraulic motors may be utilized, provided that such methods agree with the intended purpose of the present invention. Other hydraulic motors may be used to practice the invention such as for example an in-line hydraulic motor and the like, provided that such hydraulic motors do not deviate from the intended scope of the present invention.

Bent-axis hydraulic motor 18 is driven by hydraulic fluid under pressure controlled by servovalve 4 via a two-position multi-port bypass-shutoff valve 50 which is integrated in valve manifold 16 and positioned between motor 18 and servovalve 4 so as to control the flow from servovalve 4.

Bypass-shutoff valve 50 is preferably of the lapped spool-sleeve type having a pre-loaded return spring 71 and is provided with a pair of inlet ports 53 and 55 for receiving pressurized hydraulic fluid from servovalve outlet ports $M_1'$ and $M_2'$ via integrated load driving passageways 33 and 35, respectively. Bypass-shutoff valve 50 is also provided with an additional port 57 for receiving warmed low flow rate internal leakage fluid from servovalve 4 via internal leakage fluid flow path 11 and a return passageway 39 (FIGS. 1–2). On the other side, valve 50 is provided with a pair of outlet ports 58 and 60 for porting pressurized hydraulic fluid supplied via inlet ports 53 and 55 to hydraulic motor 18, respectively, a pair of outlet ports 62 and 64 for porting warmed leakage fluid supplied via inlet port 57 either to hydraulic motor 18 or to hydraulic system return (as explained hereinbelow), a pair of interconnect ports 66, 68 and a pressure balancing inlet port 69.

Bi-directional motor 18 is also provided with a pair of motor inlet ports $M_1$ and $M_2$ which receive pressurized hydraulic fluid for driving the internal rotating components 28 of hydraulic motor 18. The $M_1$ and $M_2$ ports are connected respectively to a pair of integrated hydraulic load driving passageways 20 and 22 which are coupled to outlet ports 58 and 60 of bypass-shutoff valve 50. For example, when passageway 20 is pressurized, the shaft of motor 18 may rotate clockwise and alternatively, when passageway 22 is pressurized, the motor shaft may rotate counterclockwise. As is well known, when passageway 20 is pressurized, return flow from motor 18 is through passageway 22 and when passageway 22 is pressurized, return flow from motor 18 is through passageway 20. Since hydraulic motor 18 is intended for use in low ambient temperature conditions and in accordance with a preferred embodiment of the present invention, hydraulic motor 18 is further provided with an additional integrated warming fluid passageway 38. Integrated warming passageway 38 is coupled between outlet port 62 and a warming fluid motor inlet port 40 which is preferably drilled (in valve manifold 16) in the lowest portion of the ball bearing region of motor 18 to optimize warming coverage of internal rotating components 28 (FIGS. 1–2).

Bypass-shutoff valve 50 also has a spool 52 which moves linearly within a sleeve 54 with spool 52 being driven by a three-way, two-position solenoid valve 70 mounted on one side of valve manifold 16 (FIGS. 1–2). Solenoid valve 70 has an electric coil (not shown), a supply port $P_1$ which connects to supply branch passageway 34b, a return port $R_1$ which connects to integrated output passageway 36 and a control port C coupled to bypass-shutoff valve 50 (FIGS. 1–2) for driving spool 52 linearly back and forth (position 1 and position 2 described hereinbelow) depending on whether the solenoid coil is energized or de-energized with servovalve 4 being constantly pressurized.

Position 1 (FIG. 1)

In this position, the solenoid coil is de-energized, solenoid supply port $P_1$ is blocked and solenoid control port C and solenoid return port $R_1$ are interconnected within solenoid valve 70 (balanced return pressure) thereby balancing pressures in the solenoid control port C with the pressure balancing port 69 allowing pre-loaded spring 71 to position spool 52 to block ports 53 and 55 (servovalve 4 is inactive, but constantly pressurized), block outlet port 64 and open outlet ports 62, 66 and 68 as shown in FIG. 1. As a result, warmed internal hydraulic leakage fluid from servovalve 4 is continuously ported at a low flow rate via outlet port 62 to hydraulic motor 18 via integrated warming fluid passageway 38 and warming fluid motor inlet port 40. The warmed low flow rate internal leakage fluid from servovalve 4 is continuously returned to the system via case drain port 32 establishing a continuous warming fluid circulation loop for hydraulic motor 18 when motor 18 is not operational. The temperature of the internal rotating components of hydraulic motor 18 is thereby maintained much higher than the low ambient temperature when motor 18 is not operational which helps reduce internal hydraulic motor friction resulting in increased servovalve/hydraulic motor operational efficiency and which also is a major departure from conventional hydraulic systems of this type in which the internal leakage fluid from the servovalve would have been returned directly to the hydraulic system return (without diverting the warming flow to the hydraulic motor when the same is not operational) thereby bypassing its beneficial effect. Therefore, by using this already built-in and "free" heat source (fixed jet pipe orifice 10) and modifying an otherwise standard valve manifold to include one additional integrated warming passageway (38) and one additional motor warming fluid inlet port (40) at minimal cost, the present invention fully meets the need for a viable low cost hydraulic motor warming solution.

To further appreciate the latter advantage and going back to the above example, if hydraulic motor 18 is exposed to an ambient temperature of −65° F. in an aircraft flying at 25,000 feet and the hydraulic fluid is at a low operating temperature of +20° F., the approximate temperature of the heated internal servovalve hydraulic leakage fluid and subsequently the temperature of hydraulic motor 18 would be approximately +36° F. or 101° F. above the −65° F. ambient temperature. The heated hydraulic motor temperature level will be reduced somewhat depending on valve manifold 16 fluid flow path geometry and manifold 16 hydraulic motor case drain cavity 30 internal surface area geometry which is exposed to the −65° F. ambient temperature environment. This translates into a significant increase in the internal hydraulic motor temperature. Furthermore, the relatively low flow rate of the heated internal servovalve leakage fluid allows for a more uniform warming up of the internal rotating components of hydraulic motor 18 when the same is not operational which may represent yet another advantage over prior art warming system.

Position 2 (FIG. 2)

In this position, the solenoid coil is energized, pressure is connected from solenoid port P₁ solenoid control port-C thereby positioning spool 52 to the left as viewed in FIG. 2 against pre-loaded return spring 71 to close interconnect ports 66 and 68, to open ports 53 and 55 allowing the flow of pressurized hydraulic fluid to drive motor 18 (servovalve 4 is now active and again constantly pressurized), block outlet port 62 and open outlet port 64 to divert the warmed low flow rate hydraulic leakage fluid from servovalve 4 directly to integrated valve manifold output passageway 36 as shown in FIG. 2. As a result, warmed low flow rate hydraulic leakage fluid from servovalve 4 is continuously ported via outlet port 64 into valve manifold output passageway 36 and combined with high flow rate hydraulic flow being returned to hydraulic system return via system return port 26 while hydraulic motor 18 is being driven via integrated load driving passageways 20, 22 and motor inlet ports M₁ and M₂, respectively. In this case, the combination of previously warmed internal rotating components 28 of hydraulic motor 18 and the operation of hydraulic motor 18 maintains sufficiently higher (than the low ambient temperature) temperature in the case drain cavity 30 around the rotating components of the motor to prevent degrading of motor performance in a low ambient temperature environment.

While the present invention has been described in detail with regards to the preferred embodiments, it should be appreciated that various modifications and variations may be made in the present invention without departing from the scope or spirit of the invention. Various system embodiments may be possible, however, it is important to note in this regard that practicing the invention is not limited to the applications described herein above. Many other applications and/or alterations may be utilized provided that they do not depart from the intended purpose of the present invention.

It should further be appreciated by a person skilled in the art that features illustrated or described as part of one embodiment can be used in another embodiment to provide yet another embodiment such that the features are not limited to the specific embodiments described above. Thus, it is intended that the present invention cover such modifications, embodiments and variations as long as they come within the scope of the appended claims and their equivalents.

What is claimed is:

1. A hydraulic warming system for low ambient temperature operation comprising:
    (a) a two-stage jet pipe flow control electro-hydraulic servo valve means for providing a flow of pressurized hydraulic fluid from a source thereof to a plurality of hydraulic load driving passageways, said servovalve including an inlet port coupled to said source for receiving pressurized hydraulic fluid from said source, a plurality of outlet ports coupled respectively to said plurality of hydraulic load driving passageways, a fluid flow restrictor and a return port for releasing internal hydraulic leakage fluid at low flow rate from said electro-hydraulic servovalve through a return passageway, said low flow rate internal hydraulic leakage fluid being warmed by flowing through said fluid flow restrictor;
    (b) means for controlling said flow of pressurized hydraulic fluid in said plurality of hydraulic load driving passageways, including a spool and sleeve bypass-shutoff valve having a pre-loaded return spring, a plurality of inlet ports coupled respectively to said plurality of hydraulic load driving passageways and to said return passageway and a plurality of outlet ports;
    (c) a hydraulic motor coupled between said flow controlling means and a hydraulic system return passageway and driven by said pressurized hydraulic fluid from said hydraulic servo valve means through said plurality of hydraulic load driving passageways, said hydraulic motor having internal rotating components; and
    (d) a solenoid valve coupled to said bypass-shutoff valve for driving said bypass-shutoff valve between a first position and a second position, said first position utilizing said warmed low flow rate hydraulic leakage fluid from said servovalve to provide continuous warming of said internal rotating components of said hydraulic motor when said hydraulic motor is not operational, said second position diverting said warmed low flow rate hydraulic leakage fluid from said servovalve directly to said hydraulic system return passageway bypassing said internal rotating components of said hydraulic motor when said hydraulic motor is operational, said servovalve being constantly pressurized through said inlet port from said source.

2. The hydraulic warming system of claim 1, wherein said hydraulic motor further comprises a case drain cavity having a return port coupled to said hydraulic system return passageway for closing the hydraulic system circuit and a plurality of inlet ports coupled respectively to at least some of said plurality of outlet ports of said bypass-shutoff valve through a plurality of hydraulic motor passageways, said hydraulic motor driven by pressurized hydraulic fluid flowing through said plurality of hydraulic motor passageways, said driven hydraulic motor returning pressurized hydraulic fluid at high flow rate to said hydraulic system return passageway, said warmed low flow rate hydraulic leakage fluid from said servovalve being combined with said high flow rate return flow from said hydraulic motor when said spool of said bypass-shutoff valve is in said second position.

3. The hydraulic warming system of claim 2, wherein said warming means includes said servovalve fluid flow restrictor, a warming fluid inlet port on said hydraulic motor and a hydraulic motor warming passageway coupled between one of said outlet ports of said bypass-shutoff valve and said warming fluid inlet port for continuously flowing said warmed low flow rate hydraulic leakage fluid from said servovalve to said internal rotating components of said hydraulic motor when said hydraulic motor is not operational and said spool of said bypass-shutoff valve is in said first position, said hydraulic motor returning said warmed low flow rate hydraulic leakage fluid to said hydraulic system return passageway through said case drain cavity return port.

4. The hydraulic warming system of claim 3, further comprising a hydraulic fluid distributor for integrating said hydraulic load driving passageways, said servovalve return passageway, said hydraulic motor passageways and said hydraulic motor warming passageway.

5. The hydraulic warming system of claim 4, wherein said hydraulic fluid distributor is a valve manifold having an inlet port for coupling to said source, a servovalve supply passageway coupled between said servovalve inlet port and said valve manifold inlet port and an outlet port for coupling to said hydraulic system return passageway, said servovalve operatively coupled to said valve manifold.

6. The hydraulic warming system of claim 5, wherein said valve manifold further includes a recess for integrating said hydraulic motor proximate to said operatively coupled servovalve, said case drain cavity of said hydraulic motor defined in said recess.

\* \* \* \* \*